United States Patent [19]

Hosoi

[11] Patent Number: 4,915,525
[45] Date of Patent: Apr. 10, 1990

[54] SLIP ISSUING APPARATUS

[75] Inventor: Noritaka Hosoi, Kyoto, Japan

[73] Assignee: Omron Tateisi Electronics Co., Kyoto, Japan

[21] Appl. No.: 52,127

[22] Filed: Apr. 24, 1987

Related U.S. Application Data

[63] Continuation of Ser. No. 800,778, Nov. 17, 1985, abandoned.

[30] Foreign Application Priority Data

Nov. 27, 1984 [JP] Japan ................... 59-250992

[51] Int. Cl.⁴ .............................. B41J 11/42
[52] U.S. Cl. ........................ 400/583; 400/76; 400/605; 400/607
[58] Field of Search ............ 400/621, 605–611, 400/708, 708.1, 76, 283

[56] References Cited

U.S. PATENT DOCUMENTS

| 4,007,356 | 2/1977  | Stucke et al. ............. | 235/480 |
| 4,216,719 | 8/1980  | Flaceliere et al. ......... | 400/621 |
| 4,229,113 | 10/1980 | Anderson et al. .......... | 400/605 |
| 4,234,261 | 11/1980 | Hendrischk et al. ....... | 400/621 |
| 4,255,064 | 3/1981  | Kelly ......................... | 400/708 |
| 4,272,204 | 6/1981  | Quinn, Jr. et al. ......... | 400/708 |
| 4,367,964 | 1/1983  | Cranston .................... | 400/605 |
| 4,381,705 | 5/1983  | Roes et al. ................. | 101/69  |
| 4,560,293 | 12/1985 | McCumber et al. ........ | 400/605 |

FOREIGN PATENT DOCUMENTS

| 2428354 | 1/1975  | Fed. Rep. of Germany . |         |
| 2504454 | 10/1982 | France ....................... | 400/606 |
| 36477   | 3/1983  | Japan ........................ | 400/708.1 |
| 166086  | 10/1983 | Japan ........................ | 400/605 |
| 103785  | 6/1984  | Japan ........................ | 400/283 |
| 109380  | 6/1984  | Japan ........................ | 400/76  |
| 136275  | 8/1984  | Japan ........................ | 400/605 |
| 2106837 | 4/1983  | United Kingdom .       |         |

Primary Examiner—David A. Wiecking
Attorney, Agent, or Firm—Stevens, Davis, Miller & Mosher

[57] ABSTRACT

The slip issuing apparatus comprises a support or a container for supporting or containing plural kinds of slips having different slip widths, separately; a printing device having a printing head for determining each printing range of the printing head according to each specified kind of slip and for printing predetermined data on the specified slip within each determined printing range; a conveying device for supplying a specified slip out of the slips to the printing device; and another conveying device for conveying the slip printed by the printing device to an outlet. Since the printing range can be changed according to slip widths, it is possible to print slips of plural kinds with a single printing device and to discharge the printed slips to a single outlet.

3 Claims, 7 Drawing Sheets

```
OMRON TATEISI ELECTRONICS CO.
04/28/84    02:12    012
    0812184058301211
THANK YOU FOR USE
        OMRON-ATM

DEPOSIT    TO SAV
8413053203
0146    BALANCE    150.80
TRANSFER FROM CKG TO SAV    100.00
8413053203
0147    BALANCE    250.80
WITHDRAWAL FROM SAV    200.00
8413053203
0148    BALANCE    50.80
```

(B)

① LOCATION
② DATE
③ TIME
④ MACHINE No.
⑤ CARD No.
⑥ COURTESY MESSAGE
⑦ TRANSACTION NAME
⑧ FROM/TO ACCOUNT
⑨ AMOUNT
⑩ ACCOUNT No.
⑪ SERIAL No.
⑫ BALANCE MARK
⑬ BALANCE

1ST TRANSACTION
2ND TRANSACTION
3RD TRANSACTION

Fig.2

A B C D  BANK

| LOCATION | OMRON TATEISI ELECTRONICS CO. | MACHINE | 012 |
|---|---|---|---|

| DATE, TIME | 05/11/84  18:00 |
|---|---|

| CARD No. | 0812184058301212 | ACCOUNT No. | 84058301212 |
|---|---|---|---|

|    | DATE     | TRANSACTION         | AMOUNT   | BALANCE  |
|----|----------|---------------------|----------|----------|
| 1  |          | OPENING BALANCE     |          | $205.00  |
| 2  | 05/07/84 | TRANSFER TO SAVINGS | $58.50   | $146.50  |
| 3  | 05/10/84 | WITHDRAWAL          | $100.00  | $46.50   |
| 4  |          | CLOSING BALANCE     |          | $46.50   |
| 5  |          |                     |          |          |
| 6  |          |                     |          |          |
| 7  |          |                     |          |          |
| 8  |          |                     |          |          |
| 9  |          |                     |          |          |
| 10 |          |                     |          |          |
| 11 |          |                     |          |          |
| 12 |          |                     |          |          |
| 13 |          |                     |          |          |
| 14 |          |                     |          |          |
| 15 |          |                     |          |          |
| 16 |          |                     |          |          |
| 17 |          |                     |          |          |
| 18 |          |                     |          |          |
| 19 |          |                     |          |          |
| 20 |          |                     |          |          |

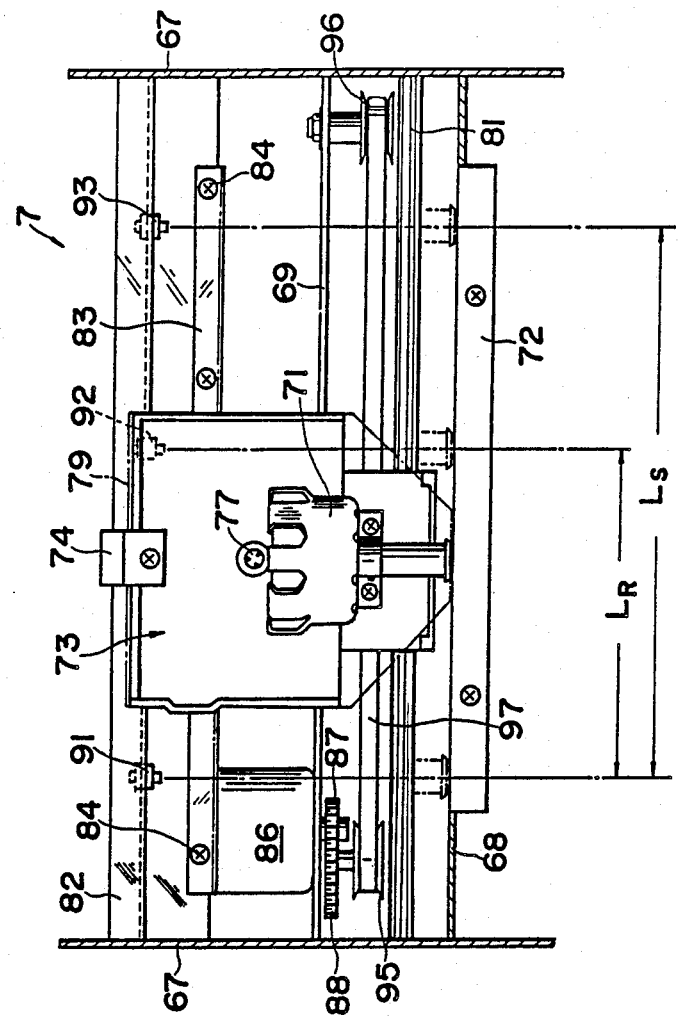
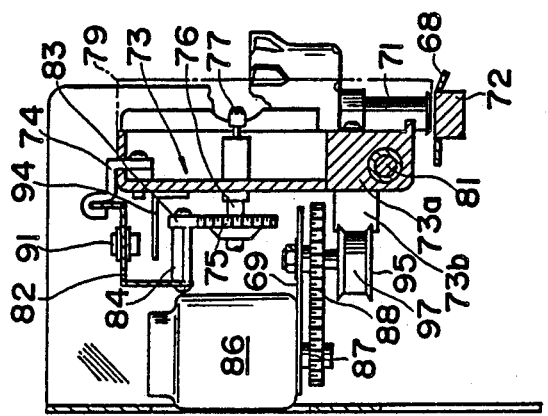
Fig. 5
Fig. 6

SLIP ISSUING APPARATUS

BACKGROUND OF THE INVENTION

The present invention relates to a slip issuing apparatus to be built within banking transaction machines represented by automated teller machines (ATM), cash dispensers (CD) or within other automated machines, and more specifically to a slip issuing apparatus for printing predetermined data (e.g. transaction data) on slips of plural kinds having different slip widths, respectively, before issuing the slips.

Throughout the present specification and claims, "slips" imply as a general rule slips obtained by cutting away rolled-up paper and sheets of paper previously contained within the apparatus in the form of separate slips, both inclusive of printed and non-printed slips. However, for reasons of convenience in description, it should be understood that "slips" include a rolled paper itself. The typical slips are receipts and statements in bank transactions.

In conventional ATMs, there are provided printers each suitable for each kind of slip in order to print data on slips of plural kinds such as receipts and statements to issue the printed slip. Therefore, there exist problems in that plural printers including printing heads are necessary, thus causing a higher manufacturing cost and a larger space occupied by the printing mechanism. Additionally, since the carrying paths for discharging printed slips are complicated in order to discharge slips of different kinds printed by different printing heads from the same discharge outlet, in the conventional ATMs the slips are discharged from different discharge outlets as classified according to the kind of slips. In this case, however, since there are formed different slip discharge outlets, the operation required for the customer is inevitably complicated, thus resulting in problems such that the customer often forgets to take or extract all the discharged slips.

SUMMARY OF THE INVENTION

With these problems in mind, therefore, it is the primary object of the present invention to provide a slip issuing apparatus which can print predetermined data on slips of plural kinds having different slip widths by means of a single printing device and can carry the printed slip to a single discharge outlet.

To achieve the above-mentioned object, the slip issuing apparatus according to the present invention comprises means for supporting or containing slips of plural kinds having different slip widths, separately; means including a printing head, for setting the printing range of the printing head according to the kind of specified slip and for printing data on the specified slip within the printing range set; means for supplying the specified slip out of supported or contained plural slips to said printing means; a slip discharge outlet; and means for conveying slips printed by said printing means to said slip discharge outlet.

The above-mentioned construction according to the present invention renders it possible to change the printing range of the printing head according to the width of a specified slip, so that it is possible to print and issue slips of plural kinds such as receipts, statements, etc. by means of a single printing head. As a result, it is sufficient to install only a single printing head in the slip printing section of the ATM, for instance, thus resulting in a reduction in machine manufacturing cost and machine space. Additionally, since there is installed only a single printing head, it is possible to construct the apparatus such that slips of different kinds can be discharged from a single discharge outlet, thus improving the machine operability for the customer while preventing the customer from forgetting to take away the issued slips.

BRIEF DESCRIPTION OF THE DRAWINGS

Preferred embodiments of the invention, which are illustrative of the best mode in which applicant has contemplated applying the principles, are set forth in the following description and shown in the drawings and are particularly and distinctly pointed out and set forth in the appended claims.

FIG. 1 illustrates a receipt as an exemplary slip, FIG. 1 (A) shows an exemplary issued receipt; FIG. 1 (B) shows the same blank receipt for assistance in explaining items to be printed thereon;

FIG. 2 illustrates a statement as an exemplary slip, on which predetermined transaction data are printed;

FIG. 5 is a front view showing the printing device mounted in the slip issuing apparatus;

FIG. 6 is a cross-sectional, partially side view, of the printing device shown in FIG. 5;

DETAILED DESCRIPTION OF THE PREFERRED EMBODIMENTS

The embodiment of the present invention will be explained with respect to its application to the slip issuing apparatus built within bank transaction machines represented by ATMs. By this slip issuing apparatus, two kinds of slips of receipt and statement can be issued. A receipt is issued for each transaction operation. Data as to one or more transactions performed in each transaction operation are printed on this receipt. A statement is a record showing deposit, withdrawal and other transactions on an account within a predetermined period (e.g. one month) for a customer having the account with a bank where the bank transaction machine is installed. The statement is issued only when the customer requires the issue thereof.

FIG. 1 (A) shows an example of an issued receipt; FIG. 2 shows an example of an issued statement. As well understood from these drawings, the receipt is different from the statement in width. For instance, the width of the receipt is 90 mm; while that of the statement is 152.5 mm. Accordingly, the printing ranges are different from each other in these slips.

The receipt shown in FIG. 1 (A) is of the type issued in so-called combined transaction service. The combined transaction implies a series of plural transactions including deposit, withdrawal and transfer, in which the transactions are executed upon being inserted cash once into the transaction machine or the transaction machine discharges cash once after the customer has finished a series of transactions. A system for executing the above-mentioned combined transaction is disclosed in U.S.

Pat. No. 4,541,057, for instance. Therefore, data of three transactions are printed on the receipt shown in FIG. 1 (A).

FIG. 1 (B) shows data to be printed on the receipt as compared with the printed receipt shown in FIG. 1 (A). In the upper half of the receipt, as depicted in FIG. 1 (B), there are printed data representative of transaction environment such as LOCATION at which the ATM is installed, DATA and TIME at which the transaction is made, MACHINE NO. by which the transaction is made, CARD NO. used for the transaction, and COURTESY MESSAGE if necessary. In the lower half of the receipt, there are printed TRANSACTION NAME indicative of the kind of transaction, FROM/TO ACCOUNT indicative of the kind of account, AMOUNT of money, ACCOUNT NO., SERIAL NO. of transaction, BALANCE MARK indicative of balance, and BALANCE of money.

On the other hand, with respect to the statement, there are printed LOCATION, MACHINE NO., DATE and TIME, CARD NO., and ACCOUNT NO. in the heading thereof as depicted in FIG. 2. The past transaction data are printed on the body of the statement.

Figure 3:
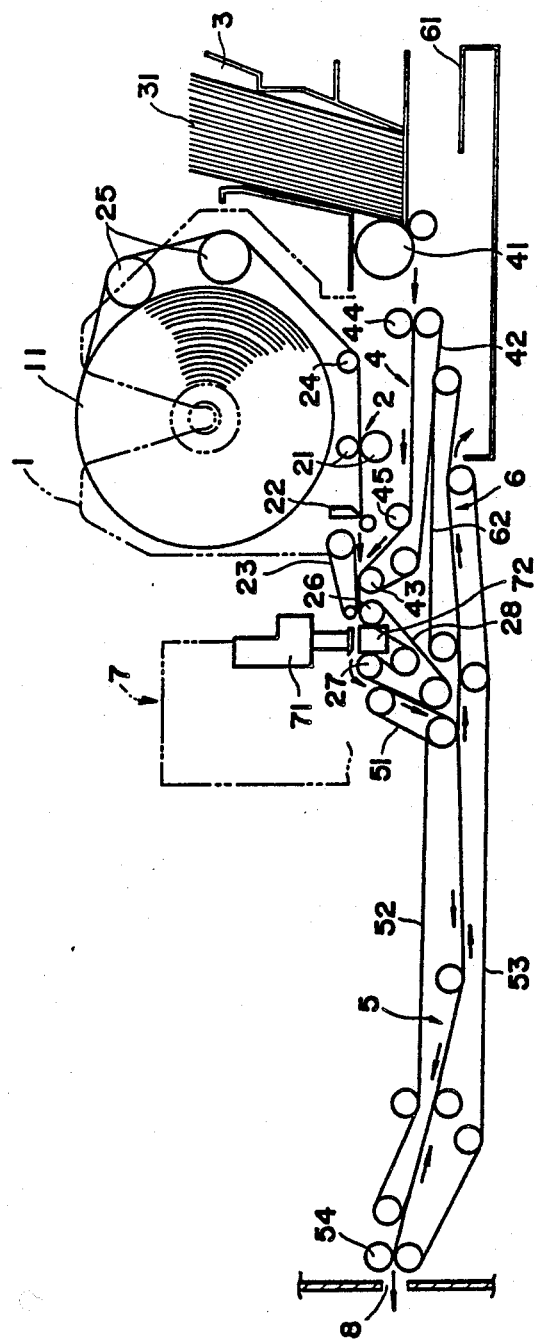
FIG. 3 is a side view schematically showing the general construction of the slip issuing apparatus embodying the present invention.
Figure 4:
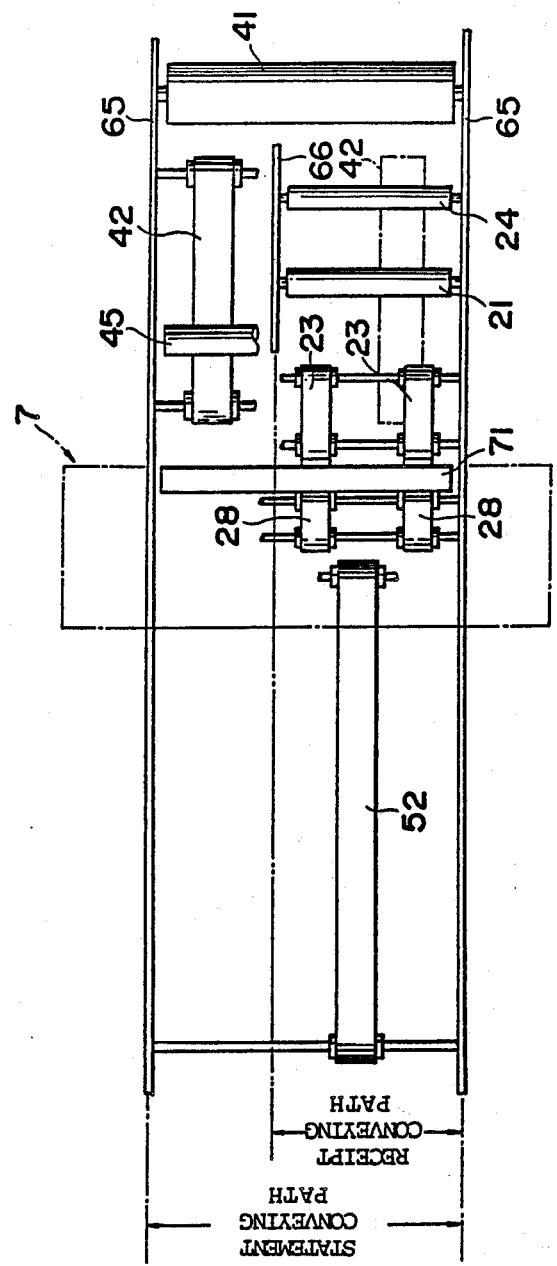
FIG. 4 is a plan view of the apparatus shown in FIG. 3, which schematically shows mainly a part of the slip conveying device.

The slip issuing apparatus for issuing the above-mentioned receipt and statement is schematically shown in FIGS. 3 and 4.

In these drawings, a rolled paper 11 for receipts is rotatably supported by a rolled paper holder 1. A first conveying device 2 for conveying the rolled paper to a printing device 7 is made up of plural guide rollers 24, 25, a pair of upper and lower feed rollers 21, and a pair of belts 23 (see FIG. 4) spaced an appropriate distance apart and reeved around rollers. A paper cutter 22 is disposed between the belts 23 and the rollers 21. The rolled paper 11 guided by the rollers 25, 24 and 21 is cut away by the paper cutter 22 to a predetermined constant length before being conveyed to the printing device 7.

A great number of statements 31 of separate slip form are contained within a hopper 3 being leaned against the wall of the hopper 3. Each statement is letout one by one by a dispenser roller 41 disposed at the lower outlet of the hopper 3. A second conveying device 4 for sending a let-out statement 31 to the printing device 7 is made up of two belts 42 reeved around a number of rollers including a roller 43, rollers 44 and 45 rotatably arranged on these belts 42 in contact with the belts 42, and the already-mentioned belts 23.

The printing device 7 which will be described in greater detail includes a printing head 71 movable in the direction perpendicular to the direction that the slips (receipt and statement) are conveyed and a platen 72 disposed under the printing head 71. On both the rear and front sides of the platen 72, there are arranged rollers 26 and 27 for feeding a slip to be printed one line by one line (line spacing rollers) and two belts 28 reeved around a number of rollers including the line spacing rollers.

A third conveying device 5 for conveying a printed slip to a discharge outlet 8 is made up of belts 51 disposed in contact with the belts 28 and reeved around some rollers, belts 52 and 53 reeved around a number of rollers and arranged so as to be in contact with each other for conveying slips by sandwiching the slips therebetween, and a discharge roller 54 disposed near a discharge outlet 8 in contact with the belt 53.

A collection tray 61 for collecting slips is disposed below the rolled paper holder 1 and the hopper 3. The above-mentioned belt 53 extends in the rearward direction to the tray 61. Further, a belt 62 reeved around rollers is disposed so as to be in contact with this belt 53. A slip collection conveying device 6 is constructed by these two belts 53 and 62. In case where the slip discharged to the discharge outlet 8 is not extracted by the customer after a predetermined time has elapsed, the third conveying device 5 is driven reversely so that the slip left in the discharge outlet 8 can be collected into the collection tray 61 through the third conveying device 5 and the collection device 6.

The above first, second and third conveying devices 2, 4 and 5 are all composed of a number of rollers rotatably supported by support plates 65 and 66 forming a frame. Further, these conveying devices include driving mechanisms having motors, clutches, etc., respectively, and are controlled independently.

As already described, since the receipt is different from the statement in width, the width of the receipt conveying path is different from that of the statement conveying path, as depicted in FIG. 4. Therefore, the above-mentioned belts, rollers, etc. are arranged in the direction of respective slip width so as to form the respective appropriate conveying paths.

FIGS. 5 and 6 show in detail the printing device 7.

Between two support plates 67 arranged on both sides so as to form a frame, there are fixedly extended a guide rod 81, a guide plate 82, and two horizontal support plate 68 and 69. The platen 72 is fixed to the horizontal support plate 68.

A slide hole is formed in a block 73a fixed to the lower portion of a carriage 73 for supporting the printing head 71. The guide rod 81 is slidably passed through this slide hole. Further, a slider 74 in fixed to the upper portion of the carriage 73. This slider 74 is slidably hung on the top standing portion of the guide plate 82. Accordingly, the carriage 73 is freely movable along the guide rod 81 and the guide plate 82 from the left to the right or vice versa in FIG. 5, that is, in the direction perpendicular to the direction that the slip is conveyed in FIG. 4.

On both the sides of the horizontal support plate 69, two pulleys 95 and 96 are rotatably disposed. A timing belt 97 is reeved around these two pulleys 95 and 96. A part of the timing belt is fixed to the carriage 73 via a fixing member 73b. On the other hand, a column feed motor 86 is fixed on this horizontal support plate 69, and a gear 87 is fixed to the drive shaft of the motor 86. This gear 87 is in mesh with a gear 88. The gear 88 is fixed to a shaft of the pulley 95. Therefore, when the drive motor 86 is driven, the carriage 73 or the printing head 71 is shifted one pitch by one pitch corresponding to one column within which a single letter or digit is printed.

As shown by dot-dashed lines 79 in FIGS. 5 and 6, an ink ribbon cassette is mounted on the carriage 73. To drive an ink ribbon wheel arranged in the mounted cassette 79, a ribbon drive gear 77 is fixed to a rotary shaft 76 rotatably supported by the carriage 73. Another gear 75 is fixed to this rotary shaft 76. On the other hand, a rack 83 is fixed to the guide plate 82 by pins 84, the rack extending in the longitudinal direction of the guide plate 82. The above-mentioned gear 75 is in mesh with this rack 83.

Therefore, when the carriage 73 is moved along the guide rod 81 and the guide plate 82 by the driving force of the motor 86, the rotary shaft 76 is rotated through the rack 83 and the gear 75; as a result, the ribbon wheel engaged with the gear 77 rotates to feed a ribbon one pitch by one pitch along the printing head 71.

The printing device can be classified into two types: In one type, printing is made only when the printing head 71 moves from the left to the right in FIG. 5, and the printing head 71 is returned at a high speed to the left end after having reached the right end. In the other type, a first line is printed when the printing head 71 is shifted from the left to the right, and a second line is printed when the printing head 71 is shifted from the right to the left after line spacing. The latter type is preferably adopted, because a high speed printing is possible.

In the case where the latter printing device is adopted, a mechanism including one-way clutches and other gears in mesh with the gear 75 (not shown) should be provided for the carriage 73 in order to always feed the ink ribbon in one direction even when the gear 75 rotates in the forward direction or in the reverse direction. In either case, the printing head and carriage as described above are well known.

As already described, the receipt is different from the statement in width, therefore the printing range is different from each other. In order to set these two different printing ranges, three position sensors 91, 92 and 93 are arranged on the guide plate 82. These position sensors detect the carriage position when the printing head 71 reaches predetermined positions at which these sensors are placed, as shown by the dot-dashed lines in FIG. 5, by detecting a detection plate 94 fixed to the carriage 73. Various sensors such as photoelectric type, electromagnetic type, etc. are usable for these position sensors.

The position of the printing head 71 detected by the sensor 91 is the base point. The range $L_R$ between this base point and a printing head position detected by the sensor 92 corresponds to the printing range of the receipt. The range $L_S$ between the base point and another printing head position detected by the sensor 93 corresponds to the printing range of the statement.

Figure 7:
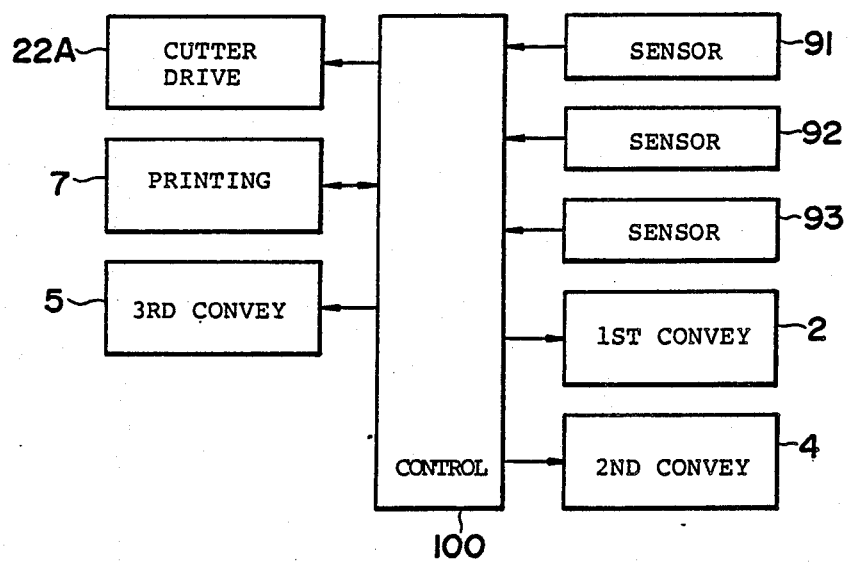
FIG. 7 is a schematic block diagram showing the electric construction of the slip issuing apparatus.

FIG. 7 schematically shows the electric configuration of the slip issuing apparatus. A controller 100 configured by a CPU and memory storing control programs controls the whole operation of the conveying devices, the printing device, etc. in response to a receipt issue command or a statement issue command.

In the case where a receipt issue command is given to the controller 100, the controller drives the first conveying device 2 to supply the rolled paper 11 toward the printing device 7 and simultaneously controls the cutter drive device 22A to operate the cutter 22 for cutting away the rolled paper 11 into a predetermined length receipt and then sends the cut-away receipt to the printing device 7. Thereafter, the controller 100 provides data to be printed to the printing device 7 and outputs a print command thereto simultaneously. Further, whenever sensor signals are imputted from the sensors 91 and 92, the controller 100 sends these sensor signals to the printing device 7. The printing device 7 prints the data for each line while feeding the receipt one line by one line by means of the belts 23, the rollers 26, etc. In each line, the given data are printed within the predetermined printing range $L_R$ by shifting the printing head 71 one column by one column. Upon completion of data printing, the third conveying device 5 is driven to discharge the printed receipt to the discharge outlet 8. In case when the discharged receipt is not extracted from the outlet 8 by the customer after a predetermined time has elapsed, the third conveying device 5 is driven in the reverse direction to collect the discharged receipt into the collection tray 61.

In the case where a statement issue command is given to the controller 100, a sheet of statement 31 is fed from the hopper 3 to the printing device 7 by the second conveying device 4. For the statement, printing for each line is made within the printing range $L_S$. After printing, the printed statement is sent to the discharge outlet 8. The statement not extracted beyond a predetermined time is of course collected into the collection tray 61. The line spacing pitches for the receipt and the statement may by the same or different from each other.

Figure 8:
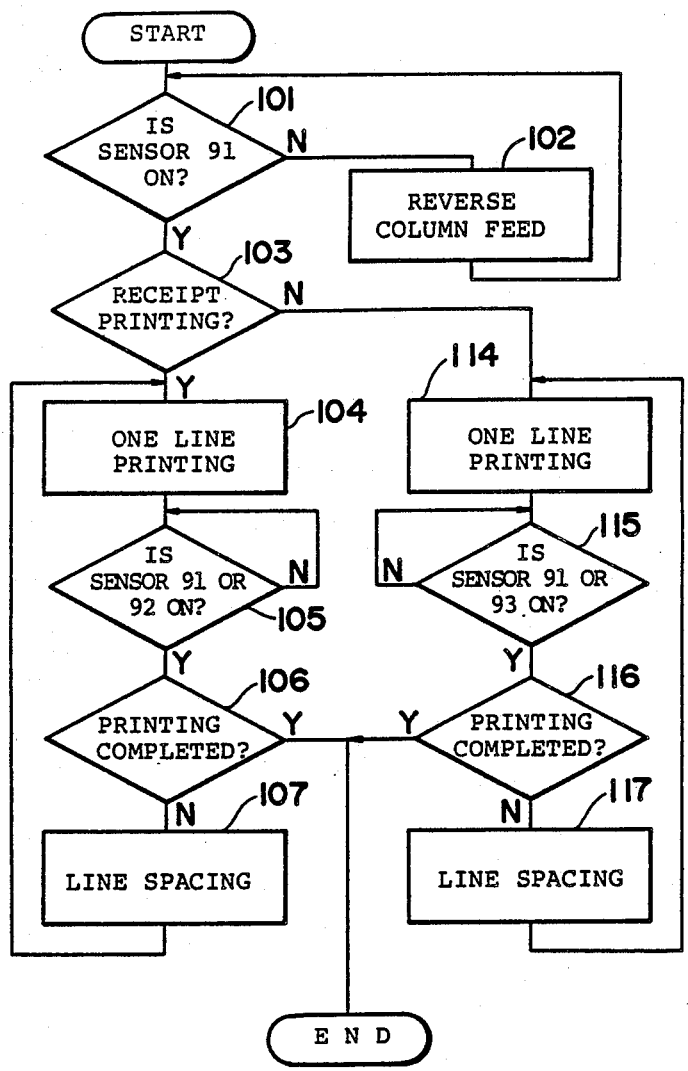
FIG. 8 is a flowchart schematically showing the flow of the print processing in the slip issuing apparatus.

FIG. 8 shows procedure of the printing processing. This printing program is executed mainly by the controller 100; however, the sub-routine is executed by the printing device 7.

When a receipt or a statement is supplied to the printing device 7 and then the first printing line is set to the printing position, control checks whether the sensor 91 is on or not (step 101). Here, the printing device 7 is of the type by which printing is made when the printing head 71 is shifted in both the directions (from left to right and vice versa) in FIG. 5. However, it should be noted that the first line printing must be made after the printing head 71 has been returned to the base point and while the printing head 71 is being shifted from the left to the right. Therefore, if the sensor 91 is not on, the motor 86 is driven in the reverse direction. The printing head 71 is kept shifted in the reverse direction until the sensor 91 is turned on (step 102).

Next, it is determined whether the receipt printing command or statement printing command is given (step 103). The printing range is different between the receipt and the statement as already described. In the case of receipt printing, $L_R$ is set as the printing range (step 105), while in the case of statement printing, $L_S$ is set as the printing range (step 115).

By the way, when the printing head 71 is set to the base position, one line printing is made while the printing head 71 is being shifted from the left to the right one column by one column corresponding to a pitch of one letter or digit (step 114). In the case of the receipt printing, when the sensor 92 is turned on (step 105), the completion of the first line printing is determined, so that the receipt is fed by one line corresponding to a pitch of one line spacing (step 107). The second line printing is made while the printing head 71 is being shifted from the right to the left. When the sensor 91 is turned on, after line spacing, the third line printing begins. As described above, every line printing is made while the printing head 71 is being reciprocated within the range $L_R$ determined by the sensors 91 and 92. When all the data have been printed, the printing processing comes to an end (step 106).

In the case of the statement printing, it goes without saying that each line printing is made while the printing head 71 is being reciprocated within the printing range $L_S$ determined by the sensors 91 and 93 (step 115).

As described above, in the slip issuing apparatus according to the present invention, since the shift range of the printing head can be changed over according to the kind of slip, it is possible to print and issue slips of different widths by means of a single printing head.

What is claimed is:

1. A slip issuing apparatus, comprising:

(a) a first rolled paper holder for supporting a rolled paper slip;

(b) second support means for supporting a second kind of slip having a slip width different from that of the rolled paper slip;

(c) printing means having a printing head movable within a predetermined printing range corresponding to a wider slip width of the rolled paper slip and said second kind of slip;

(d) first conveying means for conveying the roller paper slip supported by said rolled paper holder to said printing means, said first conveying means having a width corresponding to a width of said rolled paper slip;

(e) second conveying means for conveying the second kind of slip supported by said second supporting means to said printing means, said second conveying means having a width corresponding to a width of said second kind of slip, said first and second conveying means being positioned in spaced vertical relationship with each other;

(f) cutter means disposed adjacent said first conveying means, for cutting said rolled paper slip into predetermined lengths prior to said rolled paper slip reaching said printing means;

(g) control means for controlling said first and second conveying means so as to convey a specified kind of slip to said printing means in response to a designation of the kind of slip to be issued and for shifting the printing head within said predetermined printing range according to the specified kind of slip to print predetermined data on the slip;

(h) a slip discharge outlet means;

(i) third conveying means for conveying the slip printed by said printing means to said slip discharge outlet means; and (j) collecting means for driving said third conveying means in reverse to collect a discharged slip conveyed to said slip discharge outlet means when the discharged slip is not extracted from the outlet after a predetermined time has elapsed.

2. The slip issuing apparatus according to claim 1, wherein said printing means is provided with means for setting printing ranges of at least two kinds of slips, respectively.

3. The slip issuing apparatus according to claim 2, wherein said means for setting the printing ranges for the slips includes means for detecting the printing head at both ends of the printing ranges, respectively.

* * * * *